UNITED STATES PATENT OFFICE.

WALTER ROSENHAIN AND ERNEST H. RODD, OF TEDDINGTON, ENGLAND, ASSIGNORS TO THEMSELVES, THE IMPERIAL TRUST FOR THE ENCOURAGEMENT OF SCIENTIFIC AND INDUSTRIAL RESEARCH, OF WESTMINSTER, ENGLAND, AND RICHARD TETLEY GLAZEBROOK, OF TEDDINGTON, ENGLAND.

BASIC OXYCHLORID OF ZIRCONIUM AND PROCESS OF MAKING SAME.

1,307,882.      Specification of Letters Patent.      Patented June 24, 1919.

No Drawing. Original application filed October 13, 1917, Serial No. 196,471. Divided and this application filed November 14, 1918. Serial No. 262,528.

*To all whom it may concern:*

Be it known that we, WALTER ROSENHAIN and ERNEST HARRY RODD, both subjects of the King of Great Britain, both residing in Teddington, England, have jointly invented certain new and useful Improvements in Basic Oxychlorid of Zirconium and Processes of Making Same, of which the following is a specification.

This invention relates to a new basic oxychlorid of zirconium having the chemical formula $Zr_5O_8Cl_4.22H_2O$ and soluble in water.

This compound may be made by first dissolving wet zirconium hydroxid in a mixture of equal volumes of water and hydrochloric acid of specific gravity 1.15 and concentrating the solution until, on cooling, crystals form abundantly. These are a mixture of the known zirconium oxychlorid, $ZrO_2Cl_2.8H_2O$, with the new basic oxychlorid, $Zr_5O_8Cl_4.22H_2O$. The latter may be separated from the former by recrystallizing the mixture from hydrochloric acid of specific gravity 1.08.

An aqueous solution of the new basic oxychlorid yields a precipitate of basic sulfate of zirconium on adding sulfuric acid.

Having thus described the nature of the said invention and the best means we know of carrying the same into practical effect we claim:—

1. As a new article of manufacture a basic oxychlorid of zirconium which has the chemical formula $Zr_5O_8Cl_4.22H_2O$, and which dissolves in water, the solution yielding a precipitate of basic zirconium sulfate on addition of sulfuric acid.

2. A process for producing basic oxychlorid of zirconium of the chemical formula $Zr_5O_8Cl_4.22H_2O$, which process consists in dissolving zirconium hydroxid in a mixture of hydrochloric acid and water, concentrating the solution until, on cooling, crystals form abundantly and re-crystallizing the crystals thus formed.

3. A process for producing basic oxychlorid of zirconium of the chemical formula $Zr_5O_8Cl_4.22H_2O$, which process consists in dissolving zirconium hydroxid in a mixture of equal volumes of water and hydrochloric acid of specific gravity 1.15, concentrating the solution until, on cooling, crystals form abundantly, and re-crystallizing these crystals from hydrochloric acid of specific gravity 1.08.

In testimony whereof we have signed our names to this specification.

WALTER ROSENHAIN.
ERNEST H. RODD.